(12) United States Patent
Furusawa et al.

(10) Patent No.: US 6,205,335 B1
(45) Date of Patent: Mar. 20, 2001

(54) ZONE SELECTION METHOD FOR MOBILE RADIO COMMUNICATION SYSTEM

(75) Inventors: Reiko Furusawa; Takeshi Kunugi, both of Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/198,207

(22) Filed: Nov. 23, 1998

(30) Foreign Application Priority Data

Mar. 20, 1998 (JP) .................................................... 10-71868

(51) Int. Cl.[7] .............................. H04B 1/00; H04Q 7/22
(52) U.S. Cl. .................... 455/436; 455/422; 455/432; 455/434; 455/438; 455/464; 455/512; 455/513; 455/517; 455/561
(58) Field of Search ................................ 455/422, 432, 455/434, 436, 438–443, 444, 464, 507, 512, 513, 515–517, 525, 561

(56) References Cited

U.S. PATENT DOCUMENTS

| | | | |
|---|---|---|---|
| 4,726,050 | * | 2/1988 | Menich et al. ........................ 455/422 |
| 5,101,501 | * | 3/1992 | Gilhousen et al. ................... 455/436 |
| 5,295,180 | * | 3/1994 | Vendetti et al. ...................... 455/422 |
| 5,577,022 | * | 11/1996 | Padovani et al. ..................... 455/434 |
| 5,903,842 | * | 5/1999 | Wang et al. .......................... 455/450 |
| 5,946,621 | * | 8/1999 | Chheda et al. ....................... 455/440 |
| 6,006,073 | * | 12/1999 | Glauner et al. ...................... 455/423 |
| 6,011,787 | * | 1/2000 | Nakano et al. ....................... 455/422 |

FOREIGN PATENT DOCUMENTS 8-294169   11/1996   (JP) .

* cited by examiner

*Primary Examiner*—Lee Nguyen
*Assistant Examiner*—Simon Nguyen
(74) *Attorney, Agent, or Firm*—Helfgott & Karas, PC

(57) ABSTRACT

A zone selection method for a mobile radio communication system selects one among many radio zones and switches a primary radio zone where a given mobile terminal exists to the selected radio zone without concentrating incoming and outgoing calls at a specific radio zone. The method prioritizes the radio zones according to the reception levels of signals transmitted from the radio zones and received by the mobile terminal as well as the performance of the radio zones including the call connection ratios and channel usage ratios of the radio zones, and then, the method selects the one having the highest priority among the prioritized radio zones.

4 Claims, 26 Drawing Sheets

Fig.5

| PERFORMANCE ITEM | INDEX |
|---|---|
| RECEPTION LEVEL | 20 |
| CONNECTION RATIO | 1 |
| USAGE RATIO | 2 |

FIG. 6A

| ZONE | RECEPTION LEVEL |
|---|---|
| PRIORITY ZONE | 36 |
| ZONE 2 | 41 |
| ZONE 3 | 43 |
| ZONE 4 | 39 |
| ZONE 5 | 33 |

FIG. 6B

| REFERENCE VALUE |
|---|
| 33db |

FIG. 6C

| WEIGHT VALUE |
|---|
| 3 |
| 8 |
| 10 |
| 6 |
| 0 |

FIG. 6D

| INDEX |
|---|
| 20 |

FIG. 6E

| PRIORITY VALUE |
|---|
| 60 |
| 160 |
| 200 |
| 120 |
| 0 |

FIG. 7A

| ZONE | CONNECTION RATIO |
|---|---|
| PRIMARY ZONE | 70 |
| ZONE 2 | 30 |
| ZONE 3 | 20 |
| ZONE 4 | 60 |
| ZONE 5 | 10 |

FIG. 7B

| CRITERION |
|---|
| 70 |
| 80 |
| 70 |
| 80 |
| 80 |

FIG. 7C

| WEIGHT VALUE |
|---|
| IMPROPER |
| 62 |
| 71 |
| 25 |
| 87 |

| INDEX |
|---|
| 1 |

| PRIORITY VALUE |
|---|
| — |
| 62 |
| 71 |
| 25 |
| 87 |

Fig.9

| DATA | PRESENT VALUE | | | RESULT (PRIORITY VALUE) | | | | |
|---|---|---|---|---|---|---|---|---|
| ZONE | RECEPTION LEVEL | CONNEC-TION RATIO | USAGE RATIO | RECEPTION LEVEL | CONNEC-TION RATIO | USAGE RATIO | PRIORITY VALUE | SELECTION ORDER |
| PRIORITY ZONE | 38 | 70 | 60 | 60 | IMPROPER | 28 | — | IMPROPER |
| ZONE 2 | 41 | 30 | 30 | 160 | 62 | 114 | 336 | 1 |
| ZONE 3 | 43 | 20 | 60 | 200 | 71 | 28 | 299 | 3 |
| ZONE 4 | 39 | 60 | 10 | 120 | 25 | 170 | 315 | 2 |
| ZONE 5 | 33 | 10 | 20 | 0 | 87 | 142 | 229 | 4 |

Fig.10

| RANKING | INDEX | | |
|---|---|---|---|
| | RECEPTION LEVEL | CONNECTION RATIO | USAGE RATIO |
| 1 | 20 | 10 | 10 |
| 2 | 18 | 9 | 9 |
| 3 | 20 | 8 | 8 |
| 4 | -10 | 0 | 0 |
| 5 | -10 | 0 | 0 |
| ⋮ | ⋮ | ⋮ | ⋮ |
| 20 | 0 | 0 | 0 |

FIG. 11A

| ZONE | RECEPTION LEVEL |
|---|---|
| PRIMARY ZONE | 38 |
| ZONE 2 | 41 |
| ZONE 3 | 43 |
| ZONE 4 | 39 |
| ZONE 5 | 33 |

FIG. 11B

| PRIORITY |
|---|
| 4 |
| 2 |
| 1 |
| 3 |
| 5 |

FIG. 11C

| INDEX |
|---|
| −10 IMPROPER |
| 18 |
| 20 |
| 20 |
| −10 IMPROPER |

FIG. 12A

| ZONE | CONNECTION RATIO |
|---|---|
| PRIMARY ZONE | 70 |
| ZONE 2 | 30 |
| ZONE 3 | 20 |
| ZONE 4 | 60 |
| ZONE 5 | 10 |

FIG. 12B

| PRIORITY |
|---|
| — |
| 2 |
| 1 |
| 3 |
| — |

FIG. 12C

| INDEX | |
|---|---|
| — | IMPROPER DUE TO RECEPTION LEVEL |
| 9 | |
| 10 | |
| 8 | |
| — | IMPROPER DUE TO RECEPTION LEVEL |

FIG. 13A

| ZONE | USAGE RATIO |
|---|---|
| PRIMARY ZONE | 60 |
| ZONE 2 | 30 |
| ZONE 3 | 60 |
| ZONE 4 | 10 |
| ZONE 5 | 20 |

FIG. 13B

| PRIORITY |
|---|
| — |
| 2 |
| 3 |
| 1 |
| — |

FIG. 13C

| INDEX | |
|---|---|
| — | IMPROPER DUE TO RECEPTION LEVEL |
| 9 | |
| 8 | |
| 10 | |
| — | IMPROPER DUE TO RECEPTION LEVEL |

Fig.14

| DATA | PRESENT VALUE | | | RESULT (PRIORITY VALUE) | | | | |
|---|---|---|---|---|---|---|---|---|
| ZONE | RECEPTION LEVEL | CONNEC-TION RATIO | USAGE RATIO | RECEPTION LEVEL | CONNEC-TION RATIO | USAGE RATIO | PRIORITY VALUE | SELECTION ORDER |
| PRIMARY ZONE | 38 | 70 | 60 | -10 IMPROPER | — | — | — | IMPROPER |
| ZONE 2 | 41 | 30 | 30 | 18 | 9 | 9 | 36 | 3 |
| ZONE 3 | 43 | 20 | 60 | 20 | 10 | 8 | 38 | 1 |
| ZONE 4 | 39 | 60 | 10 | 20 | 8 | 10 | 38 | 1 |
| ZONE 5 | 33 | 10 | 20 | -10 IMPROPER | — | — | — | IMPROPER |

Fig.15

| CONDITION ZONE | PRIORITY | | |
|---|---|---|---|
| | 1st | 2nd | 3rd |
| ZONE 1 | RECEPTION LEVEL | USAGE RATIO | CONNECTION RATIO |
| ZONE 2 | USAGE RATIO | RECEPTION LEVEL | CONNECTION RATIO |
| ZONE α | β | α | σ |

Fig.16

| CONDITION / | PRIORITY | | |
|---|---|---|---|
| LEVEL DIFFERENCE | 1st | 2nd | 3rd |
| < 5 dB | USAGE RATIO | RECEPTION LEVEL | CONNECTION RATIO |
| ≧ 5 dB | RECEPTION LEVEL | USAGE RATIO | CONNECTION RATIO |

| ZONE | LEVEL | CONNECTION RATIO | USAGE RATIO |
|---|---|---|---|
| ZONE 2 | 46db | 70 % | 70 % |
| ZONE 3 | 32db | 10 % | 70 % |

Fig.19

| ZONE | SELECTION CRITERIA | | | | |
| --- | --- | --- | --- | --- | --- |
| | CONNECTION RATIO | USAGE RATIO | AUTONOMOUS -SWITCHING LEVEL DIFFERENCE | ALLOCABLE LEVEL | REPORT JUDGING THRESHOLD |
| PRIMARY ZONE | 70% | 70% | — | 26db | — |
| ZONE 2 | 80% | 70% | -5db | | 6db |
| ZONE 3 | 70% | 70% | | | |
| ZONE 4 | 80% | 70% | | | |

Fig.20

| RANKING / ITEM | 1 | 2 | 3 | 4 | 5 | ～ | 20 |
|---|---|---|---|---|---|---|---|
| RECEPTION LEVEL CONNECTION RATIO USAGE RATIO | 20 | 19 | 18 | 17 | 16 | ～ | 1 |

Fig.22

| ZONE | RECEPTION LEVEL | CONNECTION RATIO | USAGE RATIO |
|---|---|---|---|
| PRIMARY ZONE | 38db | 60 | 70 |
| ZONE 2 | 46db | 30 | 30 |
| ZONE 3 | 48db | 60 | 60 |
| ZONE 4 | 39db | 20 | 10 |

Fig.23

| ZONE | RECEPTION LEVEL | CONNECTION RATIO | USAGE RATIO | SELECTION ORDER |
|---|---|---|---|---|
| PRIMARY ZONE | IMPROPER | — | — | IMPROPER |
| ZONE 2 | 2nd PRIORITY | 1st PRIORITY | 1st PRIORITY | 1 |
| ZONE 3 | 1st PRIORITY | 2nd PRIORITY | 2nd PRIORITY | 2 |
| ZONE 4 | IMPROPER | — | — | IMPROPER |

Fig.25

| ZONE | RECEPTION LEVEL | CONNECTION RATIO | USAGE RATIO |
|---|---|---|---|
| PRIMARY ZONE | 38db | 70 | 60 |
| ZONE 2 | 48db | 30 | 30 |
| ZONE 3 | 46db | 60 | 80 |
| ZONE 4 | 39db | 20 | 10 |

Fig.26

| ZONE | RECEPTION LEVEL | CONNECTION RATIO | USAGE RATIO | SELECTION ORDER |
|---|---|---|---|---|
| PRIMARY ZONE | 4th PRIORITY | IMPROPER | — | IMPROPER |
| ZONE 2 | 1st PRIORITY | 2nd PRIORITY | 2nd PRIORITY | 1 |
| ZONE 3 | 2nd PRIORITY | 3rd PRIORITY | IMPROPER | IMPROPER |
| ZONE 4 | 3rd PRIORITY | 1st PRIORITY | 1st PRIORITY | 1 |

SAME PRIORITY

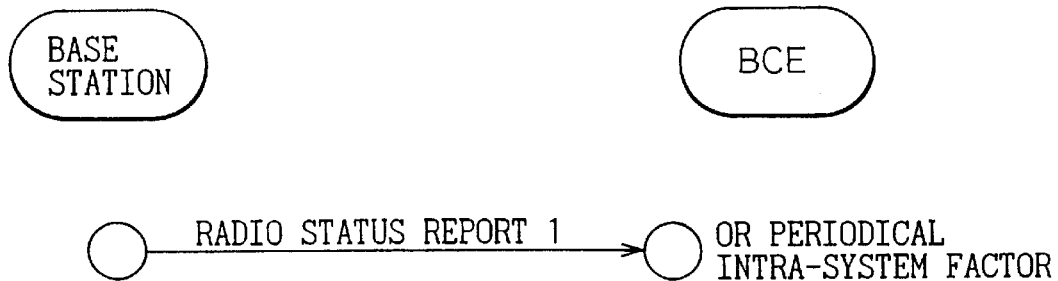
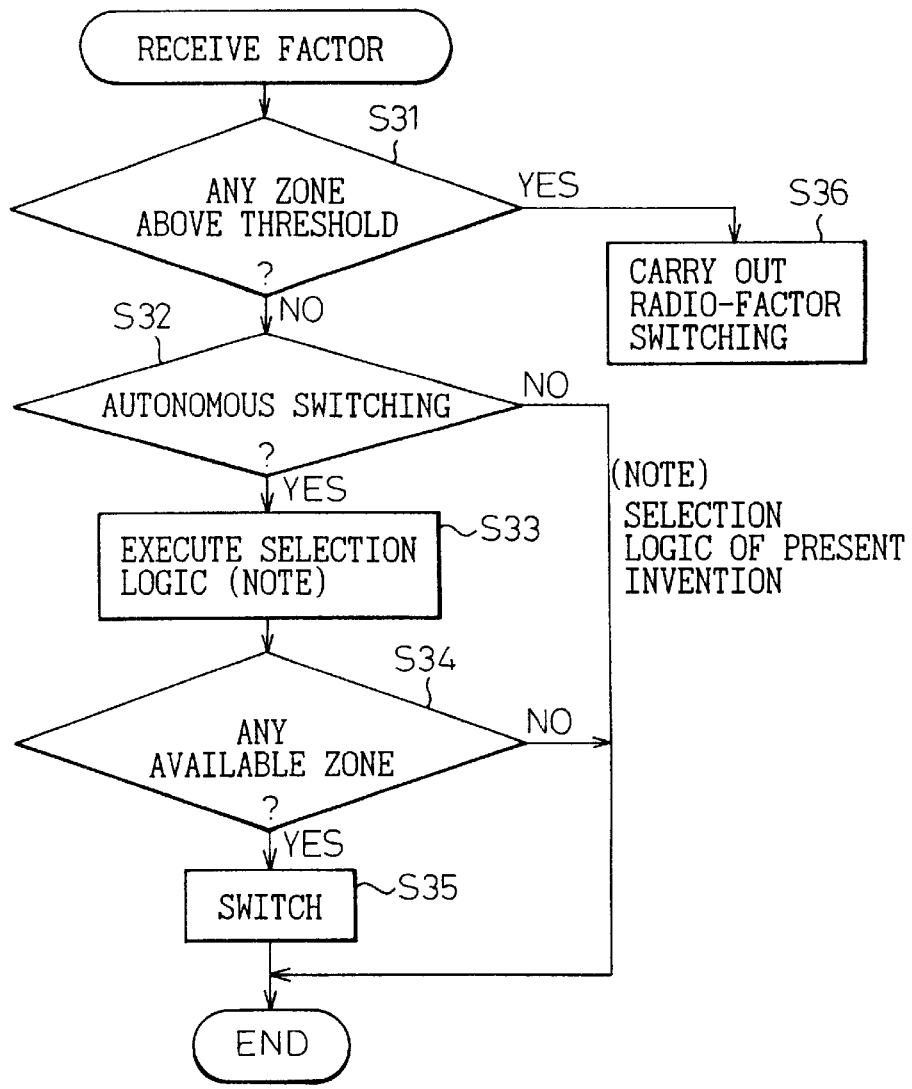

Fig.29

| ZONE | RECEPTION LEVEL | CONNECTION RATIO | USAGE RATIO |
|---|---|---|---|
| PRIMARY ZONE | 52db | 70 | 70 |
| ZONE 2 | 48db | 30 | 30 |
| ZONE 3 | 54db | 60 | 80 |
| ZONE 4 | 39db | 20 | 10 |

Fig.30

| ZONE | RECEPTION LEVEL | CONNECTION RATIO | USAGE RATIO | SELECTION ORDER |
|---|---|---|---|---|
| PRIMARY ZONE | — | — | — | — |
| ZONE 2 | 2nd PRIORITY | 1st PRIORITY | 2nd PRIORITY | 1 |
| ZONE 3 | 1st PRIORITY | 2nd PRIORITY | IMPROPER | IMPROPER |
| ZONE 4 | IMPROPER | | | IMPROPER |

ZONE SELECTION METHOD FOR MOBILE RADIO COMMUNICATION SYSTEM

BACKGROUND OF THE INVENTION

1. Field of the Invention

The present invention relates to a method of selecting one among many radio zones, in a mobile radio communication system, according to the performance of the zones.

2. Description of the Related Art

FIG. 1 roughly shows a mobile radio communication system. The system includes a mobile network 1. The mobile network 1 includes a radio exchange 2 and is connected to a public network 6.

The exchange 2 manages mobile terminals 5. The exchange 2 handles connection requests from a base station controller 3 as well as calls from calling parties for the mobile terminals 5.

The base station controller 3 controls a base station 4, relays data between the exchange 2 and the base station 4, allocates channels, and measures traffic (channel usage ratio).

The base station 4 communicates with the mobile terminals 5 through radio channels and monitors the quality of the radio channels. The base station 4 forms a radio zone (sector) to transmit radio signals between the base station 4 and the mobile terminals 5 that are used by subscribers.

The mobile radio communication system employs the following techniques:

(a) Channel selection logic

Each mobile terminal 5 monitors, while being in a waiting state, the perch channels of peripheral radio zones according to reports sent from the peripheral radio zones and measures the reception levels of signals transmitted from the peripheral radio zones, to detect a movement of the mobile terminal 5 between radio zones. The mobile terminal 5 sends a report on the reception levels of signals transmitted from the peripheral radio zones when it issues a call request or a reception acknowledgement.

In response to the call request or reception acknowledgement from the mobile terminal 5, the exchange 2 usually selects the radio zone where the mobile terminal 5 exists and finds a channel for the call in the selected radio zone. If the zone in question has no available channel, the exchange 2 finds another radio zone having an available channel according to the reception levels of the peripheral radio zones reported by the mobile terminal. The details of this are described in a document 1 "Digital Automobile Telephone System Standards (R. CR-STD)."

While talking, the mobile terminal 5 detects a move between radio zones by measuring the reception levels of signals transmitted from peripheral radio zones with the use of available slots. The mobile terminal 5 receives reports containing perch channel information from the peripheral radio zones, transmits acknowledgements of the reports, and starts to detect reception levels (Refer to the document 1).

If the channel through which the mobile terminal 5 is talking must be switched to another, the exchange 2 selects an available zone according to the reception levels of the peripheral radio zones reported by the mobile terminal 5 and secures an available channel of the selected radio zone for the mobile terminal 5.

There is selection logic called flexible reuse logic that limits selectable radio zones in the peripheral radio zones according to a reference reception level.

In the selected radio zone, an available channel is specified. The mobile terminal 5 may be a full-rate terminal that makes communication only through a full-rate channel, or a dual-rate terminal that is capable of making communication through either of a full-rate or half-rate channel. To improve the efficiency of use of channels, the exchange 2 examines the type of the mobile terminal 5 when allocating a speech channel to the mobile terminal 5.

(b) Technique of switching talking channel to another

A technique of switching a channel that is being used for speech to another will be explained.

While using a channel, the mobile terminal 5 periodically monitors the level of the channel. If the level of the channel deteriorates below a reference level, the mobile terminal 5 issues a switching request with a radio status report 2 (Refer to the document 1) to the exchange 2.

At the same time, the base station 4 monitors the quality of each channel that is being used, and if it deteriorates below a threshold, the exchange 2 autonomously switches the channel to another of the same or different radio zone.

It is possible to make a call connection through a half-rate channel and then data communication through a full-rate channel. In this case, the exchange 2 autonomously switches the half-rate channel to the full-rate channel.

When a control channel is switched to another, a corresponding speech channel must be switched accordingly.

(c) Active maintenance

When an active radio exchange or base station is subjected to maintenance or is modified, subscribers under the control of the zone of the base station must be purged therefrom. This will be explained.

The base station rejects a new call from a subscriber by radioing prohibitive information.

If there is a busy channel, the base station waits until the busy state ends or until the channel is switched to another.

Alternatively, an operator at the radio exchange may forcibly cut busy channels.

In this way, the prior art relies on the reception levels of signals transmitted from radio zones and received by a given mobile terminal when switching a zone or channel to which the mobile terminal is connected to another. Namely, the prior art assigns, to a mobile terminal, a radio zone that provides a largest reception level for the mobile terminal and selects a channel in the assigned radio zone.

If a radio zone controls many mobile terminals, the channel usage ratio of the radio zone will be high and the number of available channels of the radio zone will be small. In such a radio zone, a call connection ratio (a channel allocation success ratio) for a new call is low, if peripheral radio zones are not available.

Mobile terminals in the same radio zone have the same reception levels. If zone selection for switching is made based on only the reception levels, all of the mobile terminals in the same radio zone will select a specific radio zone. Then, even if there are peripheral radio zones that provide proper reception levels and have available channels, the terminals in the same radio zone will be switched only to channels in the specific radio zone, to cause traffic congestion in the specific radio zone.

The congested radio zone places a high load on resources such as communication frequencies and radio transmission and reception devices. To cope with this problem, a prior art averages the channel usage ratios of the peripheral radio zones. This, however, increases the number of communication frequencies and the number of radio transmission and reception devices.

SUMMARY OF THE INVENTION

An object of the present invention is to avoid a concentration of incoming and outgoing calls on a specific radio zone and prevent channels from being switched to a specific radio zone.

In order to accomplish the object, a first aspect of the present invention provides a method of selecting one among many radio zones in a mobile radio communication system according to the performance of the radio zones, so that a call for or from a mobile terminal is connected to the selected radio zone, or a talking channel of a mobile terminal is switched to the selected radio zone. To select one among many radio zones, the method prioritizes the radio zones including a radio zone (referred to as the primary zone) in which the mobile terminal exists according to the reception levels of signals transmitted from the radio zones and received by the mobile terminal and the performance of the radio zones including the call connection ratios and channel usage ratios of the radio zones.

The method considers not only the reception levels but also the call connection ratios and/or channel usage ratios of the radio zones when connecting a call for or from the mobile terminal to one of the zones or switching a talking channel of the mobile terminal to another. For example, if the channel usage ratio of the primary zone is high and that of a peripheral radio zone is low, the method selects the peripheral radio zone to connect a call of the mobile terminal, thereby reducing the channel usage ratio of the primary zone, evenly distributing traffic in the radio zones, and minimizing connection failures.

A second aspect of the present invention provides a method of prioritizing radio zones for the mobile radio communication system of the first embodiment. The second aspect prepares a table of priority indexes applied to the performance data of the radio zones. The second aspect calculates weight values that indicate deviations of the performance data of the radio zones from reference values and multiplies the weight values by the priority indexes retrieved from the table, to determine the priorities of the radio zones.

The second aspect may prepare a table of criteria used to calculate the weight values.

A third aspect of the present invention provides a method of prioritizing radio zones for the mobile radio communication system of the first embodiment. The third aspect prepares a table of priority indexes applied to the ranking of the performance data of the radio zones. The third embodiment ranks the performance data of the radio zones, attaches the priority indexes retrieved from the table to the ranked performance data, and determines the priorities of the radio zones.

The third aspect may prepare a table of criteria used to determine selectable radio zones and prioritize the selectable radio zones.

When prioritizing radio zones, the third aspect may give priority to radio zones having lower channel usage ratios over those having higher channel usage ratios. Alternatively, the third aspect may give priority to radio zones having higher channel usage ratios over those having lower channel usage ratios.

Each of the first to third aspects may prepare a table of priority conditions used to rank radio zones having the same priority. This table may register different conditions for different reception level differences between radio zones.

Each of the first to third aspects may exclude from selection the primary zone when switching a channel connected to a mobile terminal in the primary zone to another in response to a radio status report 2 issued by the mobile terminal or a level deterioration report issued by a base station.

Each of the first to third aspects may include the primary zone in selectable radio zones when switching a channel connected to a mobile terminal in the primary zone to another in response to an error rate deterioration report issued by a base station.

Each of the first to third aspects may exclude the primary zone from selectable radio zones when switching the primary zone to another in response to an autonomous switching factor.

BRIEF DESCRIPTION OF THE DRAWINGS

The present invention will be more clearly understood from the description as set forth below with reference to the accompanying drawings, in which:

FIG. 5 shows a table of priority indexes used by the weight method;

FIG. 6 shows the prioritizing of radio zones according to their reception levels based on the weight method;

FIG. 7 shows the prioritizing of radio zones according to their call connection ratios based on the weight method;

FIG. 9 shows the determination of the final priorities of radio zones according to the weight method;

FIG. 10 shows a table of priority indexes used by the ranking method;

FIG. 11 shows the prioritizing of radio zones according to their reception levels based on the ranking method;

FIG. 12 shows the prioritizing of radio zones according to their call connection ratios based on the ranking method;

FIG. 13 shows the prioritizing of radio zones according to their channel usage ratios based on the ranking method;

FIG. 14 shows the determination of the final priorities of radio zones according to the ranking method;

FIG. 15 shows a table of priority conditions used to select one among many radio zones having the same priority according to the present invention;

FIG. 16 shows a table of conditional priority conditions used to select one among many radio zones having the same priority according to the present invention;

FIG. 19 shows an example of a table of criteria used to select one among many radio zones according to the present invention;

FIG. 20 shows an example of a table of priority indexes used to select one among many radio zones according to the present invention;

FIG. 22 shows examples of performance data to trigger a channel switching operation of the present invention due to a radio factor reported in a radio status report 2 or a level deterioration report;

FIG. 23 shows the resultant priorities of radio zones according to a channel switching operation of the present invention due to a radio factor reported in a radio status report 2 or a level deterioration report;

FIG. 25 shows examples of performance data to trigger a channel switching operation of the present invention due to a radio factor reported in an error rate deterioration report;

FIG. 26 shows the resultant priorities of radio zones according to a channel switching operation of the present invention due to a radio factor reported in an error rate deterioration report;

FIG. 27 explains an autonomous switching operation of the present invention due to a radio status report 1 or a periodical inter-system factor;

FIG. 28 is a flowchart showing the steps of an autonomous switching operation of the present invention due to an autonomous switching factor reported in a radio status report 1 or due to a periodical inter-system factor;

FIG. 29 shows examples of performance data to produce an autonomous switching factor reported in a radio status report 1 or a periodical inter-system factor according to the present invention;

FIG. 30 shows the resultant priorities of radio zones due to an autonomous switching factor reported in a radio status report 1 or a periodical inter-system factor according to the present invention;

DESCRIPTION OF THE PREFERRED EMBODIMENTS

Preferred embodiments of the present invention will be explained with reference to the drawings.

Figure 1:
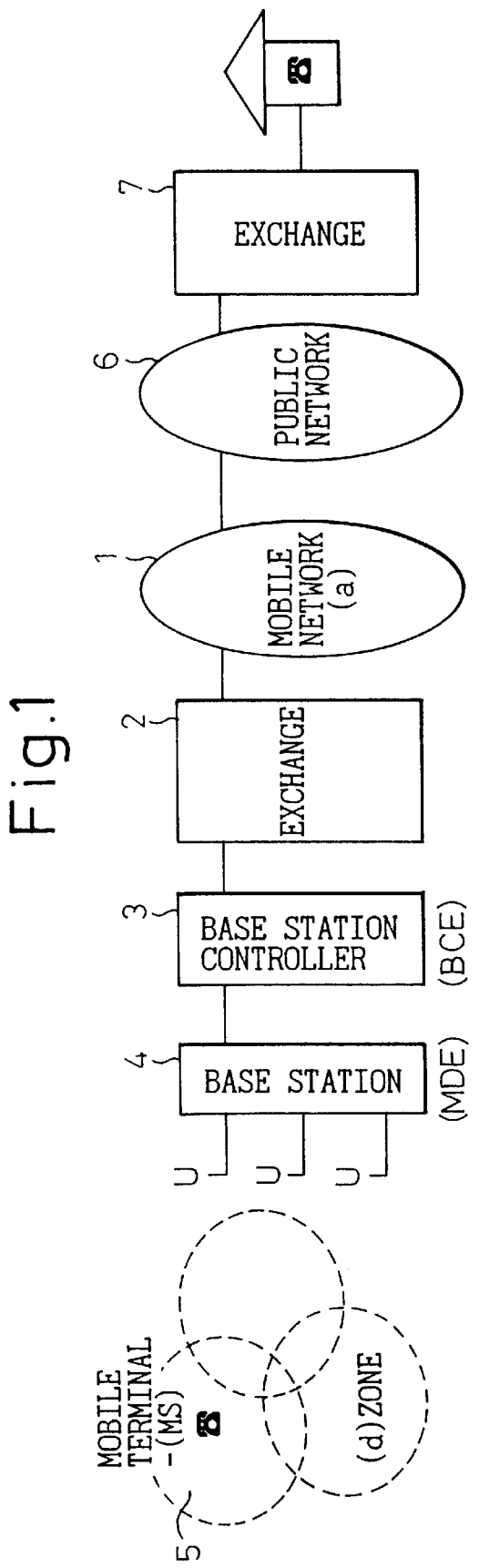
FIG. 1 is an outline of a mobile radio communication system to which the present invention is applied.

The embodiments are based on the mobile radio communication system of FIG. 1.

The embodiments employ novel selection logic and realize autonomous channel switching or purging functions, to manage the traffic or channel usage ratios of radio zones of the communication system, in order to improve the connection ratio of new calls and the efficiency of use of resources. The channel usage ratio and the call connection ratio of a radio zone around a base station are measured by the base station controller 3 or radio exchange 2.

The channel selection logic is used to select one among many radio zones, allocate a channel to a call, and switch a talking channel to another.

The autonomous switching function employs system data to determine whether or not a given radio zone must autonomously be switched to another, to minimize unnecessary switching operations.

The channel selection logic and autonomous switching or purging function will be explained.

(A) Channel selection logic

A given mobile terminal 5 reports the reception levels of signals transmitted from peripheral radio zones, and the base station controller 3 manages the performance data of the radio zones including the call connection ratios and channel usage ratios of the zones. As and when needed, the channel selection logic refers to the reception levels and performance data, determines the priorities of the performance data and reception levels, and selects the one having the highest priority among the radio zones.

The performance of the radio zones automatically prioritizes the radio zones. If there are radio zones having the same priority, a priority determination process is carried out.

(A-1) Zone selection

Figure 2:
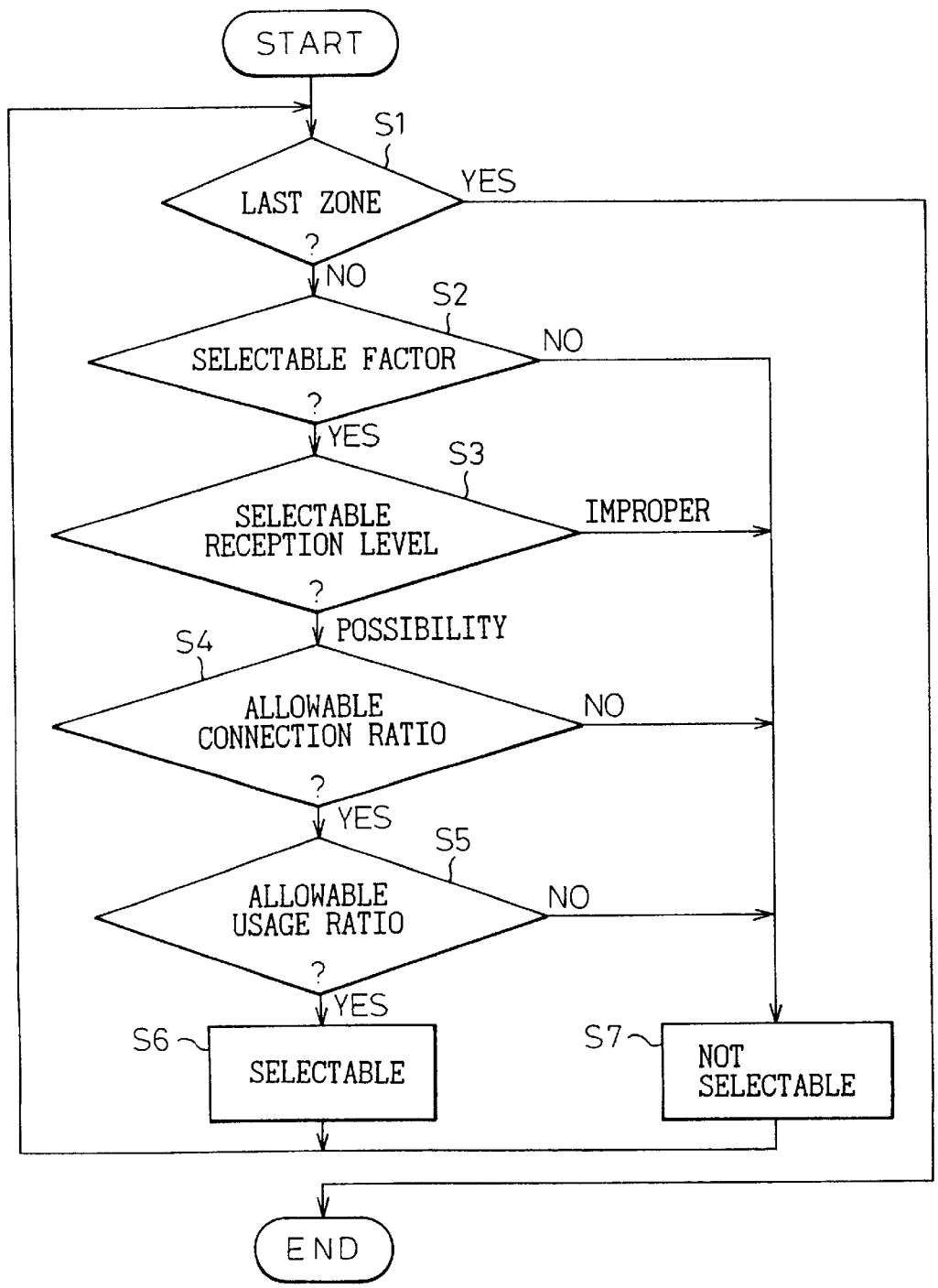
FIG. 2 is a flowchart showing the steps of selecting one among many radio zones according to an embodiment of the present invention.

FIG. 2 is a flowchart showing the steps of selecting one among many radio zones according to the selection logic of the present invention. A radio zone where a given mobile terminal exists is called the primary zone, and there are peripheral radio zones around the primary zone. The radio zones are checked one by one to see if the radio zone is selectable for setting a speech channel for the mobile terminal.

Step S2 checks to see if a target radio zone is selectable according to a switching factor to trigger a switching operation. The switching factor may be a radio factor, an autonomous factor, an online factor, or something else. The switching factor determines whether or not the target radio zone is selectable. For example, if the switching factor is based on a poor reception level, the target radio zone is not selectable.

Step S3 determines whether or not the target radio zone is selectable according to the reception level of signals transmitted from the target radio zone and received by the mobile terminal. This step is carried out in two ways:

If the switching factor is the radio factor, the type of the radio factor determines whether or not the target radio zone is selectable. There are two types of radio factor. Namely, (i) a poor level reported in a radio status report 2, and (ii) an error rate.

If the switching factor is the autonomous factor, the target radio zone is selectable if the reception level of signals transmitted from the target radio zone and received by the mobile terminal is greater than the reception level of signals transmitted from the primary zone and received by the mobile terminal plus an autonomous-switching level difference and greater than an assignable level.

Step S4 determines if the target radio zone is selectable according to a call connection ratio. If the call connection ratio of the target radio zone is below a specified value, it is selectable.

Step S5 determines if the target radio zone is selectable according to a channel usage ratio. If the channel usage ratio of the target radio zone is below a specified value, it is selectable.

(A-2) Prioritization

The priority of a radio zone is basically determined according to a deviation of the radio zone from a reference value.

(i) Weight method

A weight method according to the present invention finds a weight value for each piece of the performance data of a given radio zone. A weight value assigned to a performance data piece of a radio zone indicates a deviation of the performance data from a reference value. The weight method presets priority indexes for performance data and multiplies a weight value of a performance data piece of a radio zone by a corresponding priority index, to determine the priority of the radio zone.

(ii) Ranking method

A ranking method according to the present invention sets priority indexes for the ranking of the performance data of radio zones. The method ranks the performance data of radio zones and applies the priority indexes to the ranked performance data.

Each of the methods determines the final priorities of radio zones according to the sum of priority values.

The weight method will be explained with reference to FIG. 3.

Each radio zone has performance data. In this example, the performance data includes a reception level, a call connection ratio, and a channel usage ratio. Step S11 determines a weight value of each piece of the performance data as follows:

weight value=performance data−reference value

Step S12 determines a priority value of each piece of the performance data as follows:

priority value=weigh value×priority index

Step S13 sums up the priority values of each radio zone and determines the priorities of the radio zones according to the sums. The priority indexes applied to the performance data are preset like α, β, and γ as shown in FIG. 3.

The ranking method will be explained with reference to FIG. 4.

Step S21 ranks radio zones according to their performance data. The radio zones are ranked by sorting, for example, in order of their reception levels, or the differences of their call connection ratios or channel usage ratios from reference values. Step S22 converts the ranking of the performance data into priority indexes, which are preset for the ranking of performance data, as a in FIG. 4. Step S23 sums up the priority indexes zone by zone to determine a priority value for each radio zone and, then, prioritizes the radio zones according to the priority values.

The weight method and ranking method will be explained in more detail.

(i) Details of weight method

FIG. 5 shows an example of a table of priority indexes used by the weight method. The table contains a reception level index of 20, a call connection ratio index of 1, and a channel usage ratio index of 2. A way of prioritizing the performance data of radio zones according to the weight method will be explained in detail.

Reception level prioritization

For a given mobile terminal in a primary zone, any radio zone is selectable if the reception level of signals transmitted from the radio zone and received by the mobile terminal is above a reference value, which is set as the reception level of signals transmitted from the primary zone and received by the mobile terminal plus an autonomous-switching level difference. The difference between this reference value and the reception level of signals transmitted from a radio zone and received by the mobile terminal in the primary zone is used as a weight value to determine the priority of the radio zone in question. The autonomous-switching level difference is −5 dB in this example.

Figure 3:
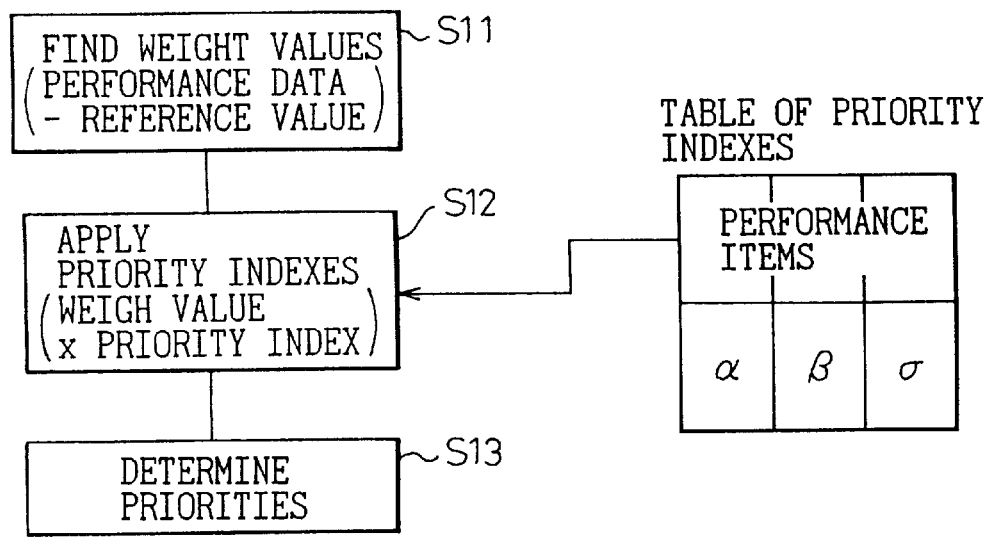
FIG. 3 is a flowchart showing the steps of prioritizing radio zones according to a weight method of the present invention.

FIG. 6 shows the prioritizing of radio zones according to their reception levels based on the weight method of FIG. 3. In FIG. 6, there are the primary zone where the target mobile terminal is present and peripheral radio zones 2 to 5. Column (a) shows the current reception levels of signals transmitted from the radio zones and received by the mobile terminal. Column (b) shows the above-mentioned reference value calculated as follows:

reference value = "the reception level of signals transmitted from the primary zone and received by the mobile terminal" −

"autonomous-switching level difference"

= 38 dB + (−5 dB) = 33 dB

Column (c) shows weight values calculated as follows:

weight value = current reception level − reference value

Column (d) shows the priority index of 20 (FIG. 5) for reception level, and column (e) shows reception-level priority values calculated as follows:

priority value=weight×priority index

As a result, it is understood that the priorities of the radio zones judged from the reception levels thereof are equal to order of the reception levels.

Call connection ratio prioritization

The processes of prioritizing the primary zone and zones 2 to 5 according to their call connection ratios based on the weight method of FIG. 3 will be explained.

The radio zones have different tolerances for call connection ratio. A maximum call connection ratio to reject a radio zone from selection is used as a minimum reference value (column (b) of FIG. 7).

FIG. 7 shows the prioritizing of the radio zones according to their call connection ratios based on the weight method of FIG. 3. Column (a) shows the current call connection ratios of the primary zone and zones 2 to 5 measured at the exchange 2. Column (b) shows the reference values for the call connection ratios. Column (c) shows weight values calculated as follows:

weight value = 100 − [(current ratio/reference value) × 100]

Column (d) shows the priority index of 1 (FIG. 5) for call connection ratio. Column (e) shows call-connection-ratio priority values calculated as follows:

priority value = weight× priority index Channel usage ratio prioritization

The prioritizing of the primary zone and zones 2 to 5 according to their channel usage ratios based on the weight method of FIG. 3 will be explained.

The radio zones have different tolerances for channel usage ratio. A maximum channel usage ratio to reject a radio zone from selection is used as a minimum reference value for the radio zone (column (b) of FIG. 8).

Figures 8A, 8B, 8C, 8D, 8E:
FIG. 8 shows the prioritizing of radio zones according to their channel usage ratios based on the weight method.

FIG. 8 shows the prioritizing of the radio zones according to their channel usage ratios based on the weight method of FIG. 3. Column (a) shows the current channel usage ratios of the radio zones measured at the exchange 2, and column (b) shows the reference values for the channel usage ratios. Column (c) shows weight values calculated as follows:

$$\text{weight value} = 100 - [(\text{current ratio}/\text{reference value}) \times 100]$$

Column (d) shows the priority index of 2 (FIG. 5) for channel usage ratio. Column (e) shows channel-usage-ratio priority values calculated as follows:

$$\text{priority value} = \text{weight} \times \text{priority index}$$

FIG. 9 shows a summary of the current values, priority values, and priorities of the radio zones based on the weight method. The priorities of the radio zones determined according to the sums of the priority values are in order of the zones 2, 4, 3, and 5. The primary zone is not selectable because its call connection ratio is too high. If the prior art that simply examines the reception levels of radio zones at a given mobile terminal is employed to determine the selection priorities of the radio zones, they will be selected in order of 3, 2, 4, primary zone, and 5. Compared with this, the weight method of the present invention considers the channel usage ratios and call connection ratios of the radio zones in determining the priorities of thereof.

(ii) Details of ranking method

FIG. 10 shows an example of a table of priority indexes used by the ranking method of the present invention. The priority indexes are assigned to the reception levels, call connection ratios, and channel usage ratios of the primary zone and radio zones 2 to 5 according to their ranks. The ranking of, for example, the reception levels of the radio zones is made in descending order. Any rank provided with a negative priority index is excluded from selection.

In this example, only three zones having the first to third highest reception levels receive positive priority indexes, and the others receive negative priority indexes so that they are excluded from selection. This technique is used to limit the number of selectable radio zones. Any limitation in the number of selectable radio zones may be set according to the present invention by adjusting the priority indexes. The priority indexes may be adjusted to give the highest priority to a radio zone whose reception level is not the highest. For example, in FIG. 10, the first zone in the ranking of reception levels receives a priority index of 15, and the second zone in the ranking receives a priority index of 20.

The call connection ratios and channel usage ratios are ranked in descending order according to the differences between current ratios and reference values.

The ranking method will be explained in more detail.

Reception level prioritization

For a mobile terminal in the primary zone, any radio zone is selectable if the reception level of signals transmitted from the radio zone and received by the mobile terminal is above a reference value, which is set as the reception level of signals transmitted from the primary zone and received by the mobile terminal plus an autonomous-switching level difference. The autonomous-switching level difference is −5 dB.

Figure 4:
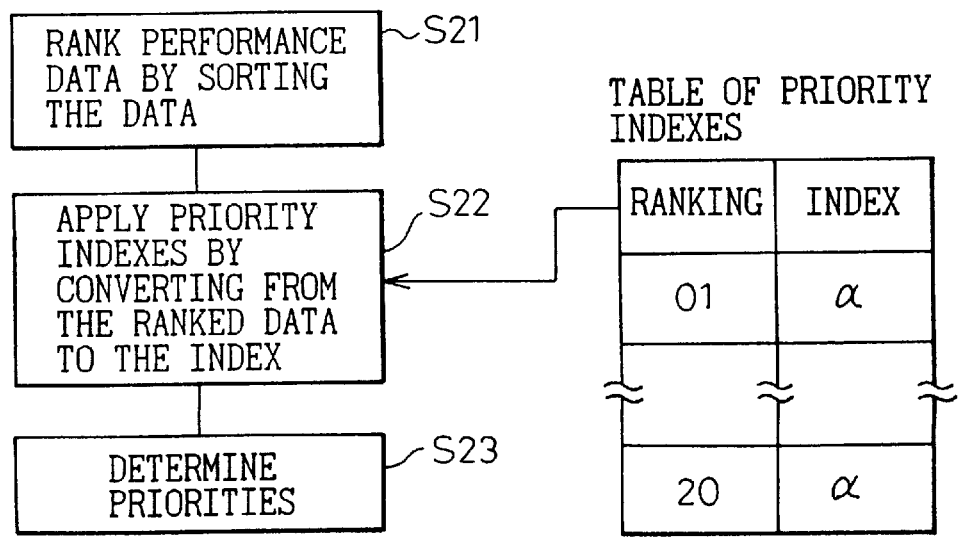
FIG. 4 is a flowchart showing the steps of prioritizing radio zones according to a ranking method of the present invention.

FIG. 11 shows the prioritizing of the primary zone and zones 2 to 5 according to their reception levels based on the ranking method of FIG. 4.

Column (a) shows the current reception levels of the radio zones informed by the mobile terminal. Column (b) shows the ranking of the reception levels of the radio zones. Column (c) shows priority indexes (FIG. 10) allocated to the ranking of column (b).

In FIG. 11, selectable radio zones are the zones 2, 3, and 4, and the primary zone and zone 5 are not selectable, to limit the number of selectable radio zones.

Call connection ratio prioritization

The prioritizing of the primary zone and zones 2 to 5, according to their call connection ratios based on the ranking method of FIG. 4, will be explained.

The radio zones have different tolerances for selectable call connection ratio. A maximum call connection ratio to reject a radio zone from selection is used as a minimum reference value (column (b) of FIG. 7).

FIG. 12 shows the prioritizing of the radio zones according to their call connection ratios based on the ranking method of FIG. 4.

Column (a) shows the current call connection ratios of the primary zone and zones 2 to 5 measured at the exchange 2. Column (b) shows the ranking of the differences between the call connection ratios and their reference values. Column (c) shows priority indexes (FIG. 10) allocated to the ranking of column (b).

Channel usage ratio prioritization

The processes of prioritizing of the primary zone and zones 2 to 5 according to their channel usage ratios based on the ranking method of FIG. 4 will be explained.

As explained above, the radio zones have different tolerances for channel usage ratio. A maximum channel usage ratio to reject a radio zone from selection is used as a minimum reference value for the radio zone (column (b) of FIG. 8).

FIG. 13 shows the prioritizing of the radio zones according to their channel usage ratios based on the ranking method of FIG. 4.

Column (a) shows the current channel usage ratios of the radio zones measured at the exchange 2. Column (b) shows the ranking of the differences between the channel usage ratios and their reference values. Column (c) shows priority indexes (FIG. 10) allocated to the ranking of column (b).

FIG. 14 shows a summary of the current values, priority values, and priorities of the radio zones based on the ranking method. According to the total priority values of the radio zones, this method gives the highest priority to the radio zones 3 and 4 and the third priority to the radio zone 2 and excludes the primary zone and the zone 5 from selection because their reception levels are poor. If the prior art that simply examines the reception levels of radio zones is employed to determine the selection priorities of the radio zones, they will be selected in order of 3, 2, 4, primary zone, and 5. There is a big difference between the present invention and the prior art.

The radio zones 3 and 4 have the same priority, and therefore, the present invention provides a method of selecting one of them.

(A-3) Selecting one among many radio zones having the same priority

This method of selecting one among many radio zones having the same priority is applicable to the weight method of FIG. 3 and the ranking method of FIG. 4.

The method employs a table of priority conditions to let a system manager freely set priority conditions.

The structure of the table will be explained.

The table may contain priority conditions, or logic expressions.

Priority conditions for each radio zone

FIG. 15 shows an example of a table of priority conditions prepared for each radio zone. The table is referred to based on the primary zone where a target mobile terminal exists and is used to select one among many radio zones having the same priority.

For example, if the primary zone is the zone 1, one among many radio zones having the same priority is selected according to a first condition, i.e., the reception levels of the equal-priority zones. If it is impossible to select one of them according to the first condition, a second condition, i.e., the channel usage ratios of the equal-priority zones are referred to. If it is still impossible to select one of the radio zones according to the second condition, a third condition, i.e., the call connection ratios of the equal-priority zones are referred to.

In FIG. 14, the primary zone is the zone 1, and therefore, the priority conditions set for the zone 1 (FIG. 15) are used to select one of the zones 3 and 4 having the same priority. Namely, the current reception levels of the zones 3 and 4 are referred to, and they are prioritized in order of 4 and 3.

Conditional priority conditions

FIG. 16 shows an example of a table of conditional priority conditions.

If radio zones selected for switching the mobile terminal existing in the primary zone thereto have the same priority, it is preferable to examine the conditions of the primary zone and selected zones and select one that secures good communication quality and minimizes the frequencies of channel switching operations. Accordingly, if the selected radio zones of equal priority involve a large reception level difference between them, it is preferable to select one having a better reception level because it seems that the mobile terminal is moving toward such a zone. If the level difference is not so large, it is preferable to select one having a larger number of available channels.

The table of conditional priority conditions is prepared in consideration of these factors. In FIG. 16, if the reception level difference between the selected radio zones is below 5 dB, the priorities are in the order of channel usage ratio, reception level, and call connection ratio. If the reception level difference is above 5 dB, they are in order of reception level, channel usage ratio, and call connection ratio.

Figures 17, 18:
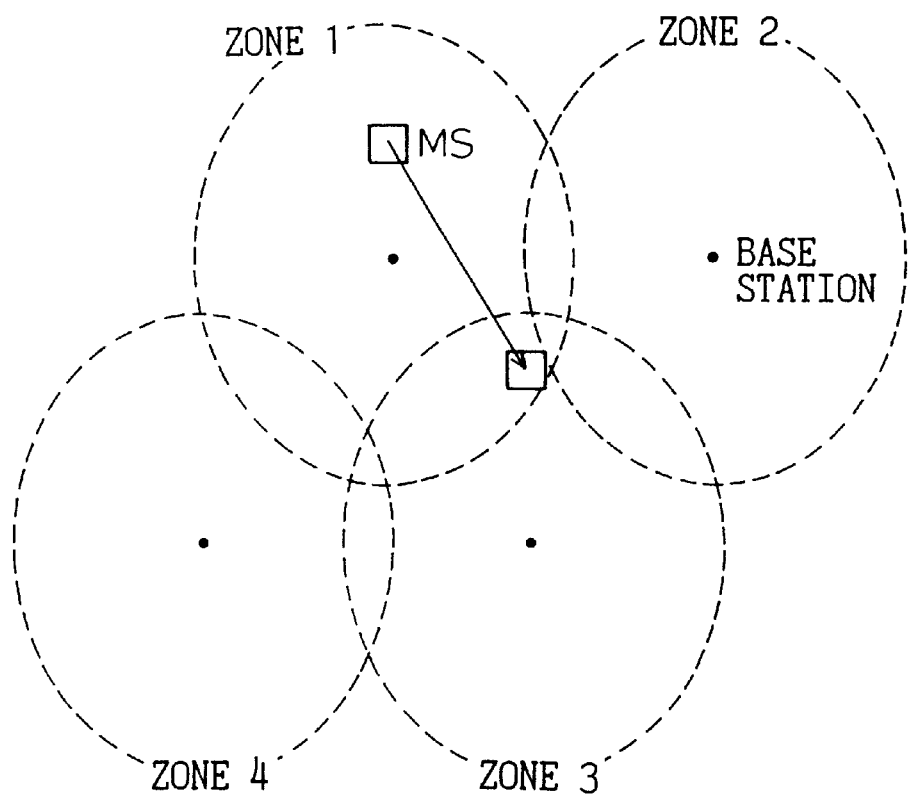
FIG. 17 shows examples of performance data based on which one among many radio zones having the same priority is selected according to the present invention.
FIG. 18 shows examples of radio zones among which one is selected according to the present invention.

FIG. 17 shows examples of the performance data of radio zones 2 and 3 having the same priority. The reception level difference between the zones 2 and 3 is 14 dB, which is larger than 5 dB. If the mobile terminal in the primary zone is connected to the zone 3 according to the channel usage ratio, the zone 3 may quickly produce a switching situation because the reception level of the zone 3 is low, and therefore, will deteriorate soon. Therefore, the table of conditional priority conditions is used because the reception level difference between the zones 2 and 3 is above 5 dB, and the table gives the highest priority to the zone 2.

(B) Selection logic

FIG. 18 shows a mobile terminal that is talking and moving from zone 1 toward zone 3. In this case, a talking channel of the mobile terminal must be switched to another. This operation will be explained. The selection logic of the present invention is applicable not only to switching a talking channel to another but also to connecting a call to a channel.

FIG. 19 shows a table of criteria for the primary zone, i.e., zone 1, and FIG. 20 shows a table of priority indexes based on the ranking method of the present invention. The table of FIG. 19 shows criteria of call connection ratios and channel usage ratios for the primary zone and zones 2 to 4, an autonomous-switching level difference of −5 dB, an allocable level of 26 dB, and a report judging threshold of 6 dB. The table of FIG. 20 employs the same priority index for the same rank of reception level, call connection ratio, and channel usage ratio. The selection logic of the present invention will be explained based on these tables.

(i) Channel switching based on radio factor

The mobile terminal in the primary zone or the base station 4 measures radio qualities according to a radio status report 2, a level deterioration report, or an error ratio deterioration report and determines whether or not a channel switching operation must be carried out.

Switching on radio status report 2 or level deterioration report

Figure 21:
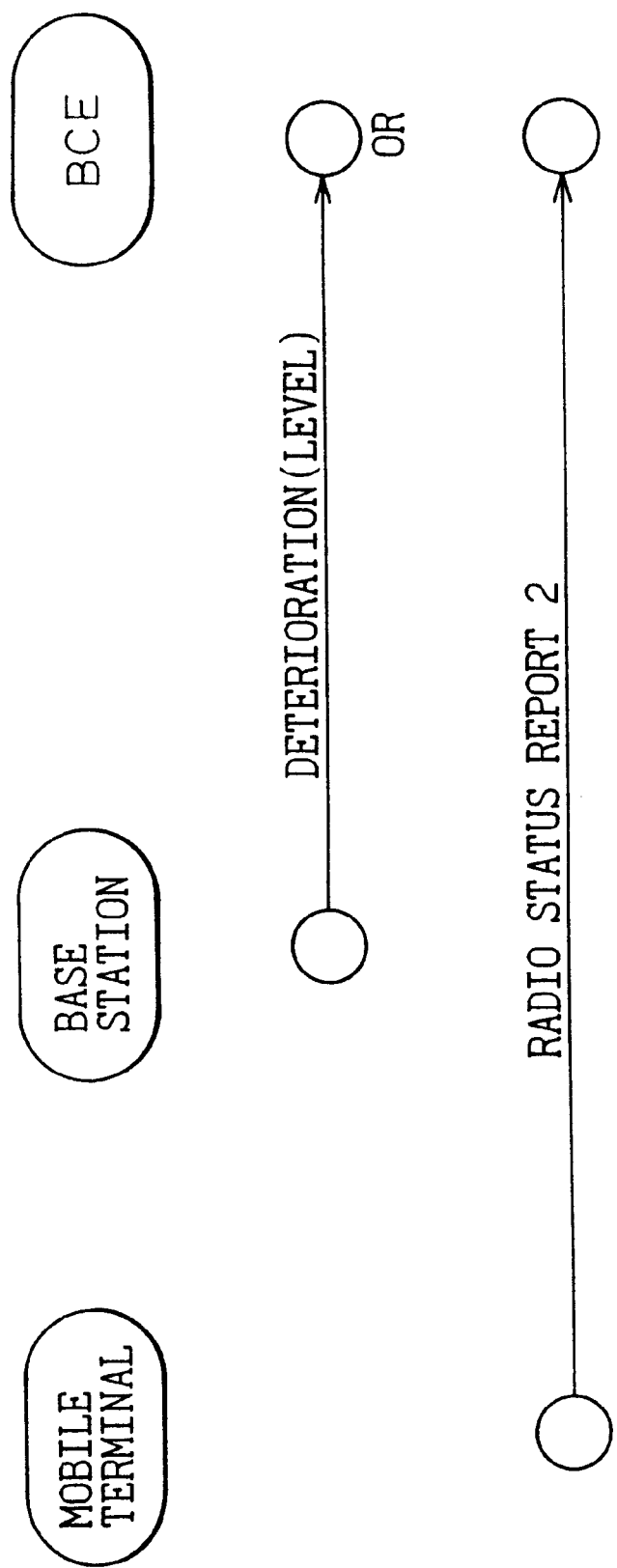
FIG. 21 explains a channel switching operation of the present invention due to a radio factor reported in a radio status report 2 or a level deterioration report.

In FIG. 21, the mobile terminal sends a radio status report 2 to the base station controller 3, or the base station 4 sends a level deterioration report to the base station controller 3. In response to any one of the reports, the mobile terminal is switched from the primary zone to another radio zone. The mobile terminal periodically detects the level of a talking channel. If the level deteriorates below a reference value, the mobile terminal sends a radio status report 2 to the exchange 2 to request the exchange 2 to switch the primary zone to another. The base station 4 monitors the radio qualities of incoming talking channels, and if the quality of any channel deteriorates below a reference value, sends a level deterioration report to ask the exchange 2 to switch the zone in question to another.

If a switching request due to such a radio factor occurs, the primary zone is excluded from selection.

FIG. 22 shows examples of reception levels contained in a radio status report 2 sent from the mobile terminal to the base station controller 3 and examples of the call connection ratios and channel usage ratios of the radio zones measured at the base station controller 3.

The flowchart of FIG. 2 is used to process the conditions of FIG. 22. Step S2 determines that it is the radio factor (i), i.e., the poor reception level, that excludes the primary zone from selection.

Step S3 of FIG. 2 checks the reception levels of the radio zones 2 to 4. Due to the radio factor, selectable radio zones must provide the mobile terminal with a reception level higher than the reception level of signals transmitted from the primary zone and received by the mobile terminal plus the report judging threshold and higher than the allocable level. Namely, zones that satisfy the following conditions are selectable:

reception level of primary zone+report judging threshold=38 dB+6 dB=44 dB or above, and assignable level=26 dB or above As a result, in addition to the primary zone, zone 4, whose reception level is 39 dB, is not selectable.

Steps S4 and S5 of FIG. 2 check the call connection ratios and channel usage ratios of the remaining radio zones 2 and 3 according to the criteria of FIG. 19. The zones 2 and 3 both satisfy the criteria of FIG. 19, and therefore, are selectable.

The ranking method of FIG. 4 and the priority index table of FIG. 20 are applied to the example of FIG. 22, to provide a result of FIG. 23. The result indicates that zone 3 has the highest priority and zone 2 the second highest priority.

Switching on error rate deterioration report

Figure 24:
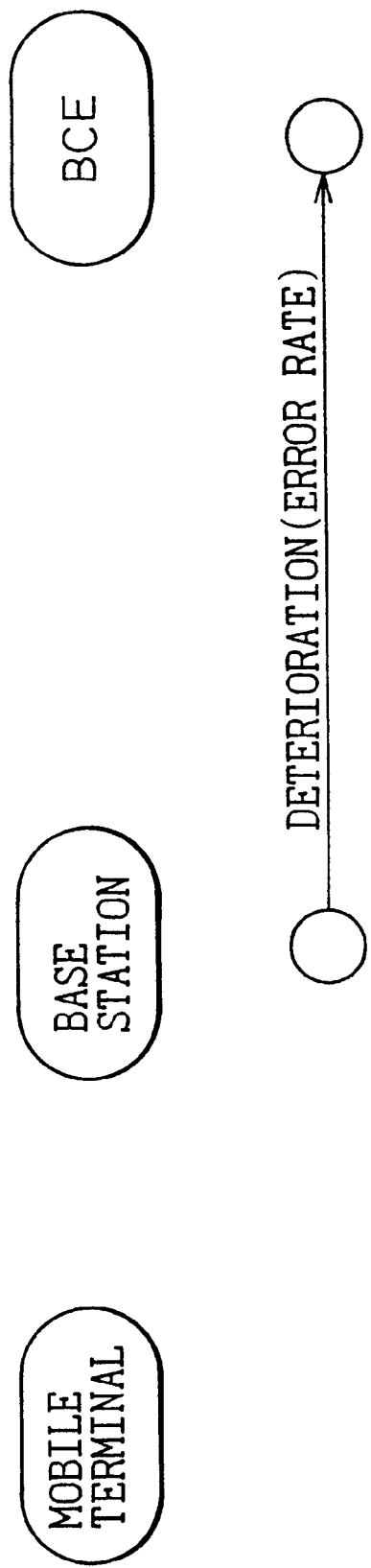
FIG. 24 shows a channel switching operation of the present invention due to a radio factor reported in an error rate deterioration report.

In FIG. 24, the base station 4 sends an error rate deterioration report to announce the occurrence of the radio factor (ii) to the base station controller 3. The radio factor (ii) allows the primary zone to be included in selectable radio zones. FIG. 25 shows the reception levels of the primary zone and zones 2 to 4 reported by the mobile terminal to the base station controller 3, and the call connection ratios and channel usage ratios of the radio zones measured at the base station controller 3.

The flowchart of FIG. 2 is applied to FIG. 25. Step S2 of FIG. 2 determines that the primary zone can be included in selectable radio zones because of the radio factor (ii).

Step S3 checks the reception levels of the radio zones. Any radio zone having a level above the allocable level is selectable. The table of criteria of FIG. 19 shows the allocable level of 26 dB, and therefore, the primary zone and zones 2 to 4 are selectable.

Steps S4 and S5 of FIG. 2 check the call connection ratios and channel usage ratios of the radio zones. The primary zone has a call connection ratio of 70% that is rejected by a reference value of 70%. Also, the zone 3 has a channel usage ratio exceeding a reference value of 70% and, therefore, is rejected.

The ranking method of FIG. 4 is applied to the remaining radio zones 2 and 4, and a result of FIG. 26 is obtained. The zones 2 and 4 have the same priority, and the table of conditional priority conditions of FIG. 16 is used. The table of FIG. 16 shows due to reception levels the determination of the priorities of the radio zones 2 and 4 because the reception level difference between the zones 2 and 4 is above 5 dB. As a result, the zone 2 receives the highest priority and the zone 4 the second highest priority.

(ii) Autonomous switching (purging)

Switching on periodical factor of mobile terminal or exchange

FIG. 27 shows an example of a factor to start an autonomous switching operation. This factor is based on a radio status report 1 from the base station 4 to the base station controller 3, or a periodical factor at the exchange 2.

Before carrying out an autonomous switching operation, it is necessary to confirm that a radio-factor-based switching operation will not occur, or that there is no zone whose reception level exceeds the reception level of signals transmitted from the primary zone and received by the mobile terminal plus the report judging threshold, and that no useless switching operations will occur. For this purpose, it is necessary to see if the autonomous switching conditions of the primary zone are met, i.e., if there is a channel switching situation.

If the radio status report 1 indicates that the difference between the reception level of signals transmitted from the primary zone and received by the mobile terminal and that of any peripheral radio zone exceeds the report judging threshold, it is necessary to carry out a radio-factor-based switching operation. If the radio status report 1 indicates no such difference, it is necessary to carry out an autonomous-factor-based switching operation. If the switching operation must be carried out, the zones and channels to switch to are selected.

A periodical factor at the exchange 2 triggers a switching operation. In this case, the exchange 2 waits for the time for the switching operation. When the time arrives, the exchange 2 determines whether or not an autonomous switching operation is achievable. If it is achievable, the zones and channels to switch to are selected and the switching operation is carried out.

FIG. 28 is a flowchart showing the steps of carrying out the autonomous switching operation. In response to a radio status report 1 or a periodical factor, step S31 checks to see if there is a peripheral radio zone whose reception level exceeds the reception level of signals transmitted from the primary zone and received by the mobile terminal plus the report judging threshold. If there is, step S36 carries out a radio-factor-based switching operation as mentioned above. If there is no such peripheral radio zone, step S32 checks to see if the primary zone needs an autonomous switching operation. If there is no need, the flow ends. If it is needed, step S33 carries out the selection logic of the present invention mentioned above. Step S34 checks to see if there is a radio zone to switch to. If there is, step S35 switches channels to the zone. If there is no such a radio zone, the flow ends.

FIG. 29 shows examples of reception levels reported by the mobile terminal in the primary zone to the base station controller 3, and examples of the call connection ratios and channel usage ratios of the primary zone and zones 2 to 4 measured at the base station controller 3.

The flowchart of FIG. 28 will be explained according to the examples of FIG. 29 and the criteria of FIG. 19. Step S31 determines that there is no peripheral radio zone whose reception level triggers a radio-factor-based switching operation. Here, the reception level of signals transmitted from the primary zone and received by the mobile terminal is 52 dB (FIG. 29), the report judging threshold is 6 dB (FIG. 19), and the sum thereof is 58 dB. As is apparent in FIG. 29, there is no peripheral radio zone whose reception level exceeds 58 dB.

Step S32 determines that the primary zone needs a switching operation and, therefore, step S33 carries out the zone selection of FIG. 2.

Step S2 of FIG. 2 excludes the primary zone because of the autonomous switching factor.

Step S3 of FIG. 2 selects any radio zone whose reception level is above the reception level of signals transmitted from the primary zone and received by the mobile terminal plus the autonomous-switching level difference and above the allocable level. Here, the reception level of signals transmitted from the primary zone and received by the mobile terminal is 52 dB (FIG. 29), the autonomous-switching level difference is −5 dB (FIG. 19), the sum thereof is 47 dB, and the allocable level is 26 dB (FIG. 19).

As a result, the zones 2 and 3 are selectable and the zone 4 is not selectable in FIG. 29.

Steps S4 and S5 of FIG. 2 check to see if the call connection ratios and channel usage ratios of the radio zones 2 and 3 satisfy the criteria of FIG. 19. Zone 3 involves a reference channel usage ratio of 70% and a current channel usage ratio of 80%, and therefore, is not selectable. Only zone 2 is selectable.

The ranking method of FIG. 4 and the priority index table of FIG. 20 provide a result of FIG. 30. In FIG. 30, the primary zone is excluded, zone 4 is not selectable because the reception level thereof is poor, zone 3 is not selectable because the channel usage ratio thereof is unacceptable, and only zone 2 is selectable.

Switching on online switching instruction

Figure 31:
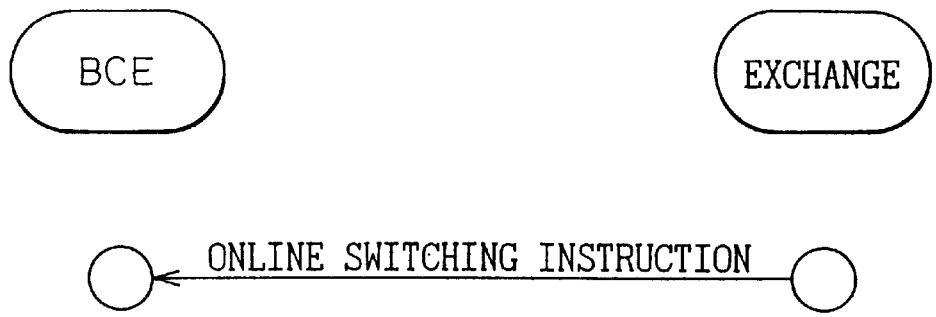
FIG. 31 shows an autonomous switching (online switching) operation according to the present invention.

FIG. 31 shows an online switching instruction issued through a control board at a higher or outside apparatus to the radio station controller 3. Upon receiving the instruction, a switching determination operation is carried out on a target radio zone. Until criteria including the call connection and channel usage ratios set for the target radio zone are satisfied, mobile terminals in the target radio zone are switched or purged to other radio zones. If a new call occurs, the target radio zone is excluded from selection, to thereby block the target radio zone from new calls. This online switching instruction is issued as and when required for a target radio zone and is disabled when criteria registered for the target radio zone are satisfied.

For example, a given radio zone is provided with a table of criteria specifying a channel usage ratio of 60% and a call connection ratio of 70%. If the radio zone involves a current channel usage ratio of 80% and a current call connection ratio of 90%, an online switching instruction will be issued to the radio zone to block the radio zone from autonomous or channel switching operations until the radio zone restores the criterial channel usage ratio of 60% and call connection ratio of 70%.

Figure 32:
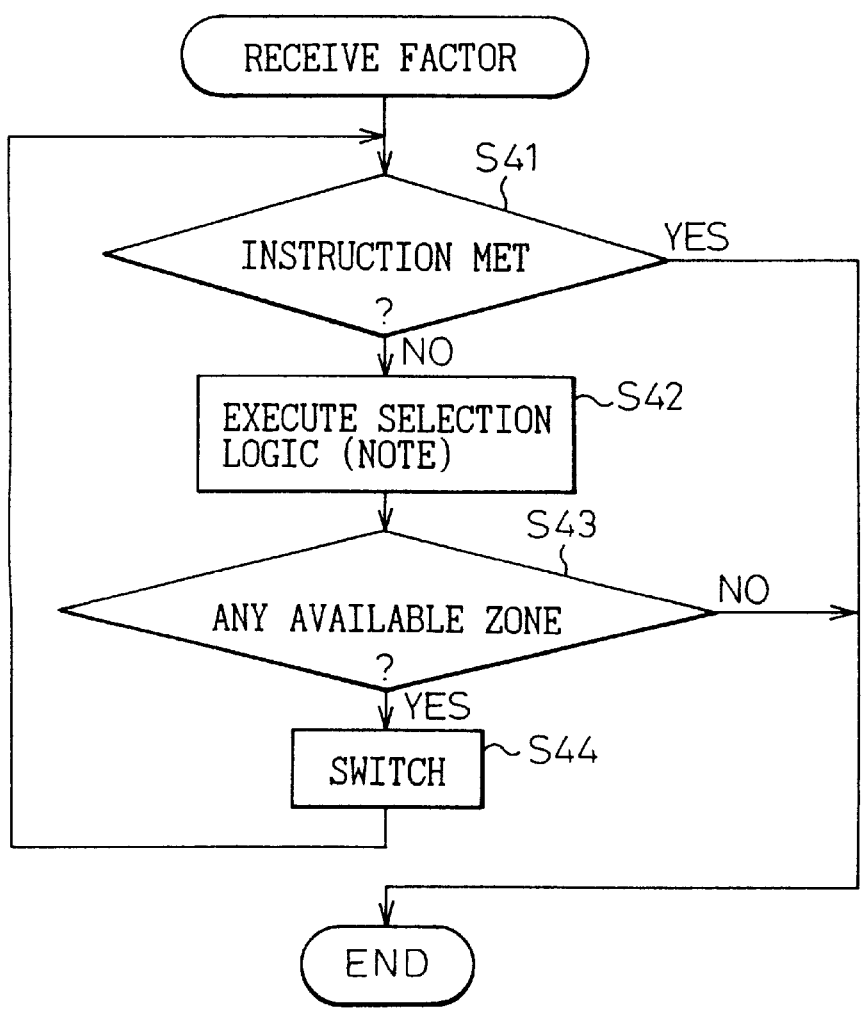
FIG. 32 is a flowchart showing the online switching operation according to the present invention.

FIG. 32 is a flowchart showing the steps of carrying out the online switching operation (purging operation). Step S41 checks to see if the conditions of a target radio zone meet instructed conditions. If so, the flow ends, and if not, step S42 carries out the selection logic of the present invention as mentioned above. Step S43 checks to see if there is a radio zone to switch to. If there is, step S44 carries out a channel switching operation, and if not, the flow ends.

When the maintenance of the base station 4 or exchange 2 takes place, the autonomous switching operation mentioned above smoothly purges talking channels of a target radio zone without interrupting the talks. Values in a table of criteria set for a given radio zone may be changed online, to avoid allocation of calls to the radio zone without special control on the radio zone.

As explained above, the present invention makes a base station controller properly measure the performance of radio zones such as the call connection ratios and channel usage ratios of the radio zones. When a factor that needs selection logic occurs on a mobile terminal in a given radio zone, the present invention grasps the current performance of the zone and automatically selects a zone to switch to under the control of a base station controller, so that the mobile terminal may continue communication with proper conditions.

The present invention carries out an autonomous switching operation to reduce failures in connecting new calls or in switching talking channels.

The present invention is capable of automatically distributing traffic to radio zones according to the performance thereof that changes every minute.

What is claimed is:

1. For a mobile radio communication system involving radio zones including a primary zone where a given mobile terminal exists, a method of selecting one of the radio zones to which a call from the mobile terminal is connected or to which a talking channel used by the mobile terminal is switched, comprising the steps of:

determining the priorities of the radio zones according to the current performance data of the radio zones including the reception levels of signals transmitted from the radio zones and received by the mobile terminal and the call connection ratios and channel usage ratios of the radio zones;

selecting one of the radio zones according to the priorities thereof;

finding weight values for the current performance data of the radio zones according to reference values; and multiplying the weight values by priority indexes retrieved from a table of priority indexes, to determine the priorities of the radio zones.

2. The method of claim 1, including the steps of:

preparing a table of criteria used to find selectable radio zones; and using the criteria as the reference values to calculate the weight values.

3. For a mobile radio communication system involving radio zones including a primary zone where a given mobile terminal exists, a method of selecting one of the radio zones to which a call from the mobile terminal is connected or to which a talking channel used by the mobile terminal is switched, comprising the steps of:

determining the priorities of the radio zones according to the current performance data of the radio zones including the reception levels of signals transmitted from the radio zones and received by the mobile terminal and the call connection ratios and channel usage ratios of the radio zones;

selecting one of the radio zones according to the priorities thereof;

preparing a table of priority indexes to be applied to the ranking of the current performance data of the radio zones;

ranking the current performance data of the radio zones;

retrieving, from the table of priority indexes, priority indexes corresponding to the ranked performance data;

prioritizing the radio zones according to the retrieved priority indexes;

preparing a table of criteria used to find selectable radio zones; and prioritizing the radio zones according to the criteria and the current performance data of the radio zones.

4. For a mobile radio communication system involving radio zones including a primary zone where a given mobile terminal exists, a method of selecting one of the radio zones to which a call from the mobile terminal is connected or to which a talking channel used by the mobile terminal is switched, comprising the steps of:

determining the priorities of the radio zones according to the current performance data of the radio zones including the reception levels of signals transmitted from the radio zones and received by the mobile terminal and the call connection ratios and channel usage ratios of the radio zones;

selecting one of the radio zones according to the priorities thereof;

preparing a table of priority conditions; and prioritizing radio zones having the same priority according to the priority conditions retrieved from the table, the table of priority conditions being capable of registering different priority conditions that are selectable according to the reception level difference between the radio zones having the same priority.

* * * * *